United States Patent [19]
Zelnik

[11] Patent Number: 5,269,417
[45] Date of Patent: Dec. 14, 1993

[54] METHOD AND ASSEMBLY FOR STORING A DOLLY BAR

[76] Inventor: David D. Zelnik, 291 Merced Dr., San Bruno, Calif. 94066

[21] Appl. No.: 921,638

[22] Filed: Jul. 30, 1992

[51] Int. Cl.⁵ .............................................. B60R 9/042
[52] U.S. Cl. ...................................... 211/60.1; 211/13
[58] Field of Search .................... 211/60.1, 13, 151; 224/42.45 R, 310; 193/35 R; 248/287, 288

[56] References Cited

U.S. PATENT DOCUMENTS

| | | |
|---|---|---|
| 2,889,907 | 6/1959 | Sullivan . |
| 3,269,557 | 8/1966 | Wahl .................... 211/151 |
| 3,826,390 | 7/1974 | Watson .................. 224/310 |
| 4,223,792 | 9/1980 | Aspen . |
| 4,390,117 | 6/1983 | Fagan .................... 211/13 |
| 4,403,698 | 9/1983 | Care et al. ............. 211/151 |

FOREIGN PATENT DOCUMENTS 0886743  1/1962  United Kingdom ................ 224/310

OTHER PUBLICATIONS

AW Direct-Towing, Recovery and Service Vehicle Accessories Catalog (No. T392, 1992), Excerpt at p. 60, Part. No. PD-21.

*Primary Examiner*—Richard K. Seidel
*Assistant Examiner*—Erik R. Puknys
*Attorney, Agent, or Firm*—Flehr, Hohbach, Test, Albritton & Herbert

[57] ABSTRACT

A dolly bar storing assembly (30) for storing an elongated dolly bar (10). The dolly bar storing assembly (30) rollingly supports two side walls (16, 17) of the dolly bar (10) which intersect along a common edge (18) in an orientation where both side walls (16, 17) are inclined relative a horizontal plane with the common edge (18) inclined downwardly. The storing assembly (30) provides rolling support and stability of the dolly bar (10) during installation and removal from the storing assembly (30). The dolly bar (10) storing assembly includes a frame (32, 32') for longitudinally supporting the dolly bar (10) and a roller mechanism (50, 50') mounted to the frame (32, 32') to provide rolling support of the dolly bar (10) longitudinally therealong relative the frame (32, 32'). The rolling mechanism supports the dolly bar (10) in a stable orientation longitudinally while further being formed to support the dolly bar (10) during rotation of the dolly bar (10) about the longitudinal axis of the dolly bar (10) between an installing position and a storing position.

19 Claims, 1 Drawing Sheet

METHOD AND ASSEMBLY FOR STORING A DOLLY BAR

TECHNICAL FIELD

The present invention relates, generally, to dolly wheel apparatuses employing dolly bars for towing vehicles and, more particularly, to storage and transportation of dolly bars when not in operational use.

BACKGROUND ART

Prior vehicle towing apparatuses incorporated towing assemblies which lifted only one end of a vehicle off the ground for towing purposes while requiring the other end to roll freely therealong on the remaining set of wheels of the towed vehicle. Sling-towing assemblies, for example, suspend one end of the towed vehicle from a tow truck boom by coupling a tow sling to the front or rear suspension of a towed vehicle. Wheel lift-towing, on the other hand, lifts one end of the towed vehicle by suspending either the front or rear set of wheels from the tow truck wheel lift. Wheel lift-towing is preferred over sling-towing since it lifts the tires, whereas sling-towing employs the use of chains around precision suspension components. Both methods, however, are still in use.

Situations develop, nonetheless, where it is not desirable to freely roll the remaining (or non-lifted) end behind the lifted end. Some four-wheel drive, severely damaged or stolen vehicles, for instance, may be incapable of being towed in this manner. Prior practices required use flatbed trucks or the like to lift and move these vehicles. More recent designs incorporate or retrofit conventional towing vehicles with dolly wheel assemblies to lift and support the remaining end of the vehicle above the ground.

Typically, dolly wheel assemblies include two wheeled units each consisting of a pair of wheels rotatably mounted to a base portion in a side-by-side relation. The two wheeled units are releasably coupled together in a spaced-apart relation by two elongated cross support tubes, hereinafter referred to as "dolly bars," mounted transverse to the two base portions. The dolly bars are adjustably spaced-apart relative to the base portion by a distance sufficient to engage and suspend the set of wheels therebetween. Accordingly, the dolly wheel assembly, consisting generally of two spaced apart wheeled units and two spaced apart transversely mounted dolly bars, provide a wheeled cradle structure formed to suspend the remaining set of wheels therebetween. While this method of carrying and supporting a towed vehicle is quite advantageous, storage of the dolly bars have proven problematic. As shown in FIG. 1, dolly bars 10 (only one of which is shown) are generally elongated and rectangular in transverse cross-sectional area which aid mounting engagement with the wheels of the towed vehicle. Furthermore, dolly bars 10 often include plate-like flanges 11 and 11' extending outward therefrom which are aligned proximate the wheels of the vehicle. Flanges 11 and 11' increase the surface area by which the wheels of the towed vehicle supportably engage. Accordingly, because of the extended length bars 10 and flanges 11 and 11', the applicable storage space provided on the towing vehicle is limited. Generally, the storage areas include the rear bed of the towing vehicle or a tool storage compartment positioned transversely across the towing vehicle.

Previously, dolly bars 10 would be manually slid into a tool compartment transversely mounted on the towing vehicle or a truck bed along the respective floors. During operation of the towing vehicle, however, dolly bars 10 would cause damage to the floors and walls as bars 10 moved around. Moreover, dolly bars 10 themselves would be damaged or prematurely wear.

This problem has been reduced by providing spaced-apart W-shaped brackets 12 and 12', as shown in FIG. 1, mounted to the floors of the storage area. Typically, brackets 12 and 12' are aligned such that they are positioned between flanges 11 and 11' of dolly bar 10. Each bracket 12 and 12' includes two wedge-shaped receiving portions 13 and 13', respectively, formed to slidably receive and support the traverse dimension of elongated dolly bar 10.

While these W-shaped brackets 12 and 12' sufficiently support and reduce movement of dolly bars 10 during vehicle operation, placement and storage of dolly bars 10 onto brackets 12 and 12' is very cumbersome. Because of the substantial weight of bars 10, some weighing nearly 50 pounds, they are difficult to manually suspend from one end when placing dolly bar 10 onto brackets 12 and 12'. Accordingly, dolly bar 10 is usually slid through each wedge-shaped receiving portion 13 and 13' in order to properly position dolly bar 10 thereon.

Dolly bars 10, however, often include stepped portions or shoulders 14 and 14', and wheel unit mounting brackets 9 and 9' extending from the ends thereof which substantially impede sliding movement of dolly bar 10 through wedge-shaped receiving portions 13 and 13'. Similarly, flanges 11 and 11' present formidable obstacles during installation and removal from brackets 12 and 12' when dolly bar 10 is oriented in receiving portion 13 and 13'. Substantial manual maneuvering of dolly bar 10 is often required to overcome these obstacles. For instance, it may be required to lift, sway or rotate dolly bar 10 from one end in order to slide dolly bar 10 past stepped portions 14 and 14', wheel unit mounting brackets 9 and 9' or flanges 11 and 11'. Such motion has caused damage to the vehicle including wiring, and items carried thereon. Further, installation is rather laborious and can cause back and hand injury to the towing technician in some instances. Moreover, the sliding contact of dolly bar 10 with brackets 12 and 12' may cause accelerated wear and tear of dolly bars 10.

DISCLOSURE OF INVENTION

Accordingly, it is an object of the present invention to provide a method and assembly for storing a dolly bar which sufficiently supports and carries the dolly bar during operation of a towing vehicle.

It is another object of the present invention to provide a method and assembly for storing a dolly bar which eases installation and removal of the dolly bar from the towing vehicle.

Still another object of the present invention is to provide a method and assembly for storing a dolly bar which may be retrofit to most towing vehicles.

It is a further object of the present invention to provide a method and assembly for storing a dolly bar which is durable, compact, easy to maintain, has a minimum number of components, is easy to use by unskilled personnel, and is economical to manufacture.

The present invention includes a dolly bar storing assembly for storing an elongated dolly bar. The dolly bar includes two substantially planar longitudinally extending side walls intersecting along a common edge which defines a wedge-shaped traverse cross-sectional area. A first flange portion is mounted proximate one end of the dolly bar and extends radially outward from a surface opposite at least one of the two side walls. The dolly bar storing assembly comprises a frame for longitudinally supporting the dolly bar. A roller mechanism mounted to the frame includes a first pair of wheel and a second pair of wheel longitudinally spaced-apart and providing rolling support of the dolly bar longitudinally therealong relative the frame. Each the first pair and the second pair of wheels is rotatably mounted to the frame at positions producing rotatable engagement with the two side walls of the dolly bar. Further, the wheels support the dolly bar in a stable orientation therebetween. Each the first pair and the second pair of wheels are spaced-apart and formed to support the dolly bar during rotation of the dolly bar about the longitudinal axis of the dolly bar between an installing position and a storing position.

In another aspect of the present invention, a method of storing the dolly bar longitudinally into a dolly bar storage assembly comprises, briefly, the steps of longitudinally inserting one end of the dolly bar into the frame having a roller mechanism formed for longitudinal rolling support of the dolly bar with the flange oriented to pass beyond the frame, rolling the dolly bar on the roller mechanism longitudinally therealong relative the frame until the flange portion is positioned inside the frame. Finally, rotating the dolly bar on the roller mechanism about the longitudinal axis of the dolly bar from an installing position to a storing position in which the flange portion cannot pass beyond the frame means.

The assembly of the present invention has other objects and features of advantage which will be more readily apparent from the following description of the Best Mode of Carrying Out the Invention and the appended claims, when taken in conjunction with the accompanying drawing.

BRIEF DESCRIPTION OF THE DRAWING

The purpose and advantages of the present invention will be apparent to those skilled in the art from the following detailed description in conjunction with the appended drawings in which.

BEST MODE OF CARRYING OUT THE INVENTION

The dolly bar storing assembly of the present invention rollingly supports the dolly bar side walls which eases installation and removal of the dolly bar from the storing assembly. While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Figure 2:
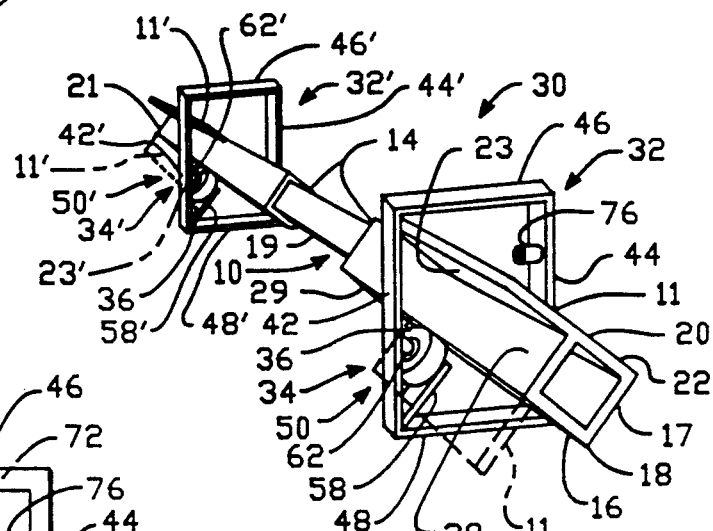
FIG. 2 is a top perspective view of a dolly bar storing assembly constructed in accordance with the present invention and illustrating the dolly bar mounted thereto.
Figure 3:
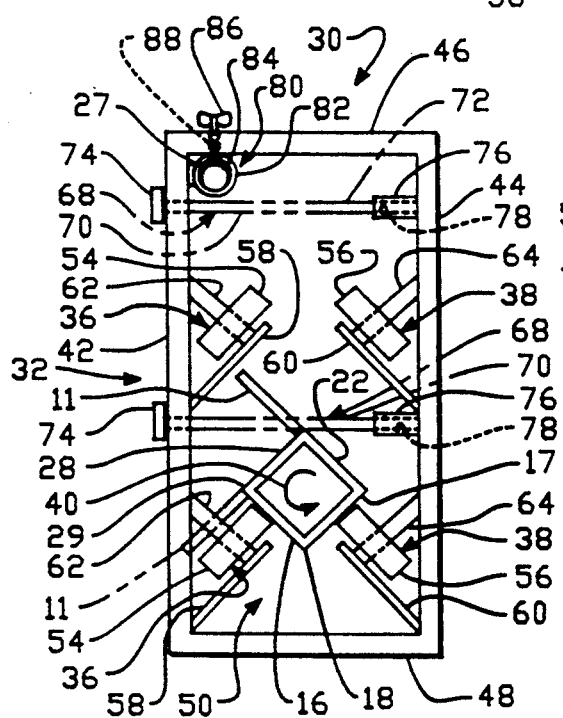
FIG. 3 is an enlarged front elevation view of the dolly bar storing assembly of FIG. 2 and illustrating the dolly bar being rotated between an installing position (solid lines) and a storing position (phantom lines).

It will be noted here that for a better understanding, like components are designated by like reference numerals throughout the various figures. Attention is now directed to FIGS. 2 and 3, where a dolly bar storing assembly, generally designated 30, is illustrated mounted to a floor of a tool compartment (not shown) or the like. Briefly, assembly 30 of the present invention includes a pair of rectangular shaped frame members, generally designated 32 and 32', spaced-apart at distances sufficient to longitudinally support and releasably store elongated dolly bar 10 therein. Each frame member 32 and 32' includes roller means 34 and 34' having wheels 36, 38 and 36', 38', respectively, mounted at angles allowing dolly bar 10 to rotatably engage therewith and to provide rolling support for installation onto frame members 32 and 32'. Such rotatable engagement facilitates movement of dolly bar 10 in the direction along a longitudinal axis of dolly bar 10 relative frame members 32 and 32' for storage and support purposes. Moreover, wheels 36 and 38 of front frame member 32, and wheels 36' and 38' of rear frame member 32' are spaced-apart, respectively, and formed to support the dolly bar during rotation about the longitudinal axis of dolly bar 10 between an installing position (shown in solid lines in FIGS. 2 and 3) and a storing position (shown in phantom lines in FIGS. 2 and 3), as will be described in more detail below.

Figure 1:
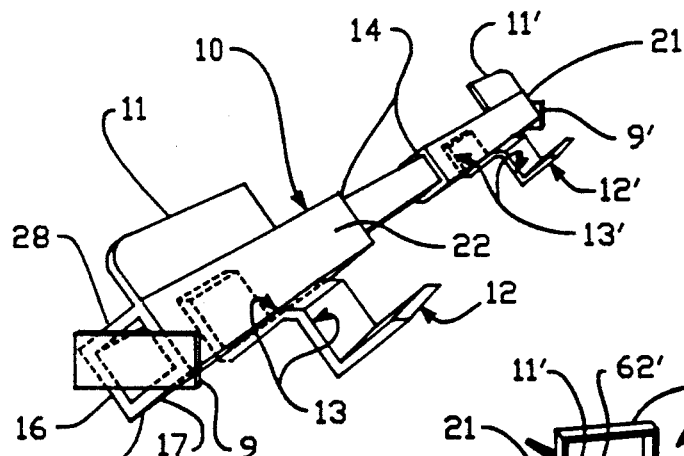
FIG. 1 is a top perspective view of a dolly bar supported on a prior art W-shaped storage bracket.

As best shown in FIG. 2 and as above indicated, dolly bar 10, well known in the art, is generally an elongated bar 10 having at least two substantially planar longitudinally extending side walls 16 and 17 which intersect along a common edge 18, and which define a wedge-shaped traverse cross-sectional area (FIG. 3). More preferably, the transverse cross-sectional area is rectangular or rhombus shaped. An intermediate portion 19 (FIG. 1) of dolly bar 10 includes a cross-sectional dimension differing from the wedge-shaped transverse cross-sectional areas of first and second ends 20 and 21, respectively. The junctures between the differing cross-sectional areas create stepped portions or shoulders 14 along common edge 18. As mentioned above, these shoulders 14 cause difficulties sliding dolly bar 10 past the prior art W-shaped brackets 12 and 12' shown in FIG. 1. It will be appreciated, however, that wheel unit mounting brackets, shown in FIG. 1 (i.e., 9 and 9'), are not included in the dolly bars of FIGS. 2 and 3 for clarification purposes.

Generally, quick lift or pop-up dolly wheel assemblies of the self-loading type (not shown and well known in the art) include dolly bars 10 having flange portions 11 and 11 extending radially outward from at least one surface 22, 28 opposite side walls 16 and 17. Flange portions 11 and 11' are mounted proximate first and second ends 20 and 21, respectively, of dolly bar 10 and facilitate support of a towed vehicle (not shown) when the vehicle is cradled in the dolly wheel assembly.

According to the present invention, roller means 34 and 34' are formed and positioned to provide rolling support of the two side walls 16 and 17 longitudinally in an orientation where both side walls 16, 17 are inclined relative a horizontal plane with common edge 18 extending downwardly. Roller means 34 and 34', hence, facilitate positioning of stepped portions 14 past front frame member 32 which eases installation. Contrary to the prior art, dolly bar 10 only need be pushed longitudinally to overcome engagement of stepped portion 14 of bar 10 with roller means 34. Thus, the present invention eliminates the need to lift one end of dolly bar 10 to move stepped portion 14 past front frame member 32.

Furthermore, when dolly bar 10 is situated in the installation orientation, flange portions 11 and 11' of dolly bar 10 will be facing upwardly, as shown in solid lines in FIGS. 2 and 3, and will not be in a position to interfere with frame members 32 and 32'. Such interference-free orientation of flange portions 11 and 11' permits dolly bar 10 to be moved in the longitudinal direction of dolly bar 10 relative frame members 32 and 32' during installation.

Although it is advantageous to orient flange portions 11 and 11' upwardly to avoid collision with frame members 32 and 32', it is desirable to reposition dolly bar 10 so that flange portions 11 and 11' will be more efficiently angled for storage and securement. More importantly, if dolly bar 10 were left in the installing position, dolly bar 10 would be free to move longitudinally relative roller means 34 and 34' during movement of towing vehicle. Therefore, dolly bar 10 is secured to storing assembly 30 after installation onto frame members 32 and 32' to prevent the aforesaid relative motion therebetween.

In accordance with the present invention, to secure dolly bar 10 to storing assembly 30, dolly bar 10 is rotated about the longitudinal axis thereof approximately 90°, in the direction of arrow 40 in FIG. 3, between the installing position and the storing position. Upon rotation of dolly bar 10, inner edges 23 and 23' of flange portions 11 and 11' are moved to a position where they can engage frame members 32 and 32', as shown in phantom in FIGS. 2 and 3. Accordingly, stored dolly bar 10 reciprocates longitudinally relative frame members 32 and 32', substantial relative movement therebetween is prevented when inner edges 23 and 23' contact side portions 42 and 42' of frame members 32 and 32'. Dolly bar 10 will then be releasably secured thereto.

In the preferred form, opposing surface 22 and side wall 16 of dolly bar 10 intersect along a second common line 29 at an angle substantially similar to the angle of intersection between side wall 16 and 17. This configuration will provide the most support to stably secure dolly bar 10 between wheels 36 and 38, and 36' and 38' when surface 22 and side wall 16 engage roller means 34 and 34' in the storing position.

The angle of intersection between side wall 16 and surface 22, however, does not have to equal the angle between side walls 16 and 17 in order to secure and support dolly bar 10 to storing assembly 30. Moreover, it will be understood that dolly bar 10 may be rotated approximately 90° in a direction opposite arrow 40 to secure dolly bar 10 therewith without departing from the true nature and spirit of the present invention.

The spacing between front frame member 32 and rear frame member 32', when mounted to floor, should be sufficient to allow rotation of dolly bar 10 between the installing position and the storing position without interference of flange portions and respectively, thereof. However, the spacing between frame members 32 and 32' must not be so small as to permit dolly bar 10 to reciprocate longitudinally by a large distance. In the preferred form, frame members 32 and 32' are to be spaced-apart by a distance substantially equivalent to the distance between inner edges 23 and 23' of flange portions 11 and 11'. Hence, inner edges 23 and 23' will be positioned just outside the outward facing edges of frame members 32 and 32' when dolly bar 10 is moved to the storing position (phantom lines in FIG. 3). Furthermore, inner edges 23 and 23' are positioned sufficiently proximate side portions 42 and 42' of frame members 32 and 32', respectively, for contact therebetween when dolly bar 10 reciprocates longitudinally small distances. The spacing between frame members 32 and 32', of course, may be varied, depending on compartment space provided in the towing vehicle as well as the distance between inner edges 23 and 23' of dolly bar 10.

Referring now to FIG. 3, frame member 32 of storing assembly 30 will be described in greater detail. Because frame member 32 and frame member 32' are substantially similar, a detailed description of frame member 32' will not be necessary. Frame member 32 is essentially a rectangular-shaped frame having opposing side portions 42 and 44 joined together at the ends thereof by upper and lower cross-members 46 and 48, respectively. FIG. 3 illustrates that side portions 42 and 44 are preferably positioned substantially parallel one another, as are upper and lower members 46 and 48. This parallel configuration, however, is not necessary to realize the benefits of the present invention.

In the preferred embodiment and as shown in FIG. 3, roller means 34 includes an upper and lower roller mechanism 50 and 52 each providing a set of wheels 36 and 38 so that two dolly bars (not both shown) may be secured to storing assembly 30. Roller mechanisms 50 and 52 are vertically aligned relative one another for space efficiency. It will be appreciated however, that mechanisms 50 and 52 may be mounted in a side-by-side relation or that storing assembly 30 may only provide a single mechanism 50 (FIG. 2) without departing from the true spirit and nature of the present invention.

FIG. 3 illustrates that wheels 36, 38 are mounted about wheel axes 62, 64 canted downwardly and inwardly toward one another so that side wall engaging surfaces 54, 56 of wheels 36, 38 abut the corresponding side walls 16, 17, respectively, at contact planes (not shown) which are substantially parallel to corresponding side walls 16, 17. Accordingly, roller mechanism 52 provides rolling support of dolly bar 10 longitudinally therealong.

Preferably, each wheel 36, 38 is rotatably mounted to a bracket member 58, 60, respectively, extending upwardly and inwardly from oppositely facing side portions 42, 44 toward an interior portion of frame member 32. Wheel axes 62, 64 about which wheels 36, 38, are pivotally mounted extend, respectively, between side portions 42, 44 and proximate the distal ends of bracket members 58, 60. Preferably, wheel axes 62, 64, canted downwardly and inwardly, are oriented substantially parallel to corresponding side walls 16, 17.

In accordance with the present invention, the contact planes of wheels 36 and 38 must be spaced-apart and respectively angled inwardly toward one another not only to facilitate rolling support of dolly bar 10 longitudinally, but also to support dolly bar 10 during rotation about the longitudinal axis thereof between the installing position (shown in solid lines in FIGS. 2 and 3) and the storing position (shown in phantom lines in FIGS. 2 and 3). Thus, if wheels 36 and 38 are spaced too closely together, roller mechanisms 50, 52 may not sufficiently and stably support dolly bar 10 therein. On the other hand, should wheels 36 and 38 be spaced too far apart, roller mechanisms 50, 52 may not supportably permit dolly bar 10 to be rotated about the longitudinal axis thereof between the storing position and the installing position.

Wheels 36 and 38 are replaceable and may be composed of polyurethane, rubber or the like. However, wheels 36 and 38 may also be composed of metal, ceramic or a composite material without departing from the true spirit of the present invention.

Figure 4:
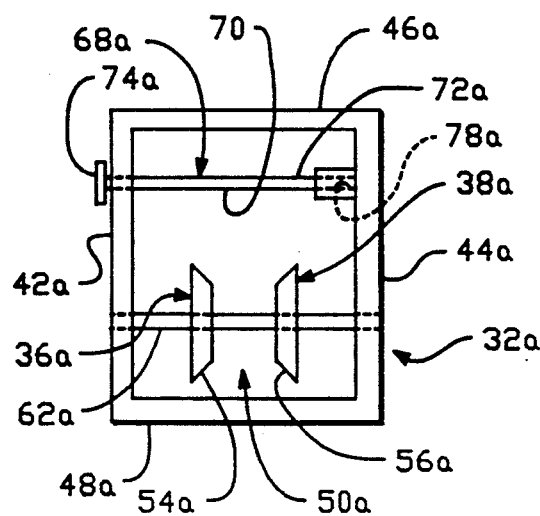
FIG. 4 is an enlarged front elevation view of an alternative embodiment of the dolly bar storing assembly employing bevelled wheels.

FIG. 4 illustrates an alternative configuration of storing assembly 30 the present invention. Wheels 36a, 38a include bevelled side wall engaging surfaces 54a, 56a which contact corresponding side walls (not shown) of the dolly bar (not shown). In this embodiment, wheels 36a, 38a are mounted for rotation about a single axis 62a. Hence, side wall engaging surfaces 54a, 56a are not substantially parallel to wheel axis 62a. However, bevelled side wall engaging surfaces 54a, 56a, nonetheless contact corresponding side walls 16a, 17a at contact planes which are substantially parallel to corresponding side walls 16a, 17a.

In an alternative embodiment of the present invention, a locking bolt 68 (phantom lines in FIG. 3), releasably mounted to frame member 32, extends sufficiently close to stored dolly bar 10 to substantially reduce vertical movement of relative frame member 32. Bolt 68 includes a shaft portion 70 having a threaded end 72 and an opposite manually engaging end 74. Locking bolt 68 extends transversely from one side member 42 to opposite side member 44 and is positioned proximate stored dolly bar 10. As best shown in FIG. 3, shaft portion 70 is sufficiently close to opposing surface 22 of dolly bar 10 so that dolly bar 10 may not be substantially displaced vertically. Accordingly, dolly bar 10 will be prevented further secured to frame member 32 when moved to the stored position. Finally, the contact planes of wheels 36 and 38 must be spaced-apart and respectively angled inwardly toward one another not only to facilitate rolling support of dolly bar 10 longitudinally, but also to support dolly bar 10 during rotation about the longitudinal axis thereof between the installing position and the storing position.

Once dolly bar 10 has been installed into storing assembly 30 and rotated to the stored position (phantom lines in FIGS. 2 and 3), locking bolt 68 is positioned through an aperture (not shown) provided in side member 42. Threaded end 72 is then engaged with a locking base portion 76 mounted to opposite side member 44 to releasably secure bolt 68 thereto. Base portion 76 includes a receiving cavity 78 formed and dimensioned to matingly engage threaded portion 72 of locking bolt 68. Accordingly, locking bolt 68 may be manually engaged or disengaged with base portion 76 by turning engaging end 74.

In still another alternative embodiment of the present invention, a leverage pole supporting mechanism 80 (FIG. 3) is provided to releasably mount a leverage pole 27 (well known in the art), used to pop up dolly wheel assemblies of the self-loading type, to storing assembly 30. Preferably, frame member 32 includes a leverage pole bracket member 82 coupled between upper cross-member 46 and side member 42, as best viewed in FIG. 3. Pole bracket member 82 provides an opening 84 formed and dimensioned to receive the traverse cross-sectional area of leverage pole. Hence, one end of leverage pole is mounted to front pole bracket member 82 while the opposite end is mounted to rear pole bracket member (not shown). A securing bolt 84 extend through a threaded aperture 88 provided in upper cross-member 46 to securably engage leverage pole thereagainst.

A method of storing dolly bar 10 longitudinally into dolly bar storage assembly 30 is provided which comprises the steps of longitudinally inserting one end 20, 21 of dolly bar 10 into frame members 32, 32' having roller mechanisms 50, 50' formed for longitudinal rolling support of dolly bar 10. To permit proper insertion, flanges 11, 11' are oriented to pass beyond frame members 32, 32'. The next step includes rolling dolly bar 10 on roller mechanisms 50, 50' longitudinally therealong relative frame members 32, 32' until flange portion 11' is positioned inside frame member 32 and just past frame member 32'. Lastly, rotating dolly bar 10 on roller mechanisms 50, 50' about the longitudinal axis of dolly bar 10 from an installing position (solid lines in FIGS. 2 and 3) to a storing position (phantom lines in FIGS. 2 and 3) in which flange portions 11, 11' cannot pass beyond frame members 32, 32' (i.e., side portions 42, 42'), respectively.

The method of the present invention may include the step of vertically securing dolly bar 10 against roller mechanism 50 by extending locking bolt 68 transversely through side portions 42, 44 of frame member 32 until locking bolt 68 is positioned sufficiently close to a surface of dolly bar 10 to prevent substantial vertical movement of dolly bar 10 relative roller mechanism 50 and secure dolly bar 10 thereagainst.

What is claimed is:

1. A dolly bar storing assembly for storing an elongated dolly bar therein, said storing assembly comprising:

an elongated dolly bar including two planar longitudinally extending side walls intersecting along a common edge to define a wedge-shaped traverse cross-sectional area, and a first flange portion mounted proximate one end of the dolly and extending radially outward from a surface opposite at least one of the two side walls;

frame means for longitudinally supporting the dolly; and roller means including a first pair of wheel members and a second pair of wheel members longitudinally spaced-apart and providing rolling support of the dolly bar longitudinally therealong relative said frame means, each said first pair and said second pair of wheel members rotatably mounted to said frame means at positions producing rotatable engagement with the two side walls of the dolly bar and supporting the dolly bar in a stable orientation therebetween, each said first pair and said second pair of wheel members further being spaced-apart and formed to support the dolly bar during rotation of the dolly bar about the longitudinal axis of the dolly bar between an installing position and a storing position.

2. The dolly bar storing assembly as defined in claim 1 wherein, each said first pair of wheels and each said second pair of wheels are positioned to provide rolling support of the two side walls of the dolly bar in an orientation where both side walls are inclined relative a horizontal plane with the common edge extending downwardly.

3. The dolly bar storing assembly as defined in claim 2 wherein, each wheel of said first pair of wheels and each wheel of said second pair of wheels includes a side wall engaging surface rotatably contacting the respective side wall at a contact plane, said contact plane being substantially parallel to the respective side wall.

4. The dolly bar storing assembly as defined in claim 3 wherein,
each wheel of said first pair of wheels and each wheel of said second pair of wheels is rotatably mounted about an axis oriented substantially parallel to the respective side wall.

5. The dolly bar storing assembly as defined in claim 3 wherein,
the angle of intersection between said contact planes of said first pair of wheels is about 90°, and the angle of intersection between said contact plane of said second pair of wheels is about 90°.

6. The dolly bar storing assembly as defined in claim 2 wherein,
said frame means includes a first pair of spaced-apart side portions each of which rotatably supports one wheel of said first pair of wheels about first wheel axes, and a second pair of spaced-apart side portions each of which rotatably supports one wheel of said second pair of wheels about second wheel axes.

7. The dolly bar storing assembly as defined in claim 6 wherein,
said dolly bar includes a second flange portion mounted proximate an opposite end of the dolly bar and extends radially outward from the surface opposite at least one of the two side walls, each the first flange portion and the second flange portion having inner edges oppositely facing one another, and
said first side portions being spaced-apart from said second side portions such one of said first side portions is positioned proximate the inner edge of the first flange for contact therebetween when the dolly bar is in said storing position, and one of said second side portions is positioned proximate the inner edge of the second flange for contact therebetween when the dolly bar is in said storing position.

8. The dolly bar storing assembly as defined in claim 6 wherein,
each side portion of said first pair and said second pair of side portions is substantially vertical.

9. The dolly bar storing assembly as defined in claim 1 wherein,
said roller means including a third pair of wheel members rotatably mounted to said frame means substantially vertically above said first pair of wheel members, and further including a fourth pair of wheel members rotatably mounted to said frame means substantially vertically above said second pair of wheel members, said third pair and said fourth pair of wheel members being longitudinally spaced-apart and providing rolling support of a second dolly bar longitudinally therealong relative said frame means, each said third pair and said fourth pair of wheel members positioned to produce rotatable engagement with two side walls of the second dolly bar and supporting the second dolly bar in a stable orientation therebetween, each said third pair and said fourth pair of wheel members further being spaced-apart and formed to support the second dolly bar during rotation of the second dolly bar about the longitudinal axis of the second dolly bar between an installing position and a storing position.

10. The dolly bar storing assembly as defined in claim 6 further including:
vertical stop means releasably mounted to said frame means and engageable with the opposite surface of the dolly bar for reducing vertical displacement of the dolly bar relative said frame means when the dolly bar is in said storing position.

11. The dolly bar storing assembly as defined in claim 10 wherein,
said stop means includes a bolt member having a shaft portion extending transversely from one side portion of said first pair of side portions to the other side portion of said first pair of side portions, said shaft portion being positioned proximate the opposite surface of the dolly bar for contact therewith.

12. The dolly bar storing assembly as defined in claim 6 further including:
leverage pole mounting means coupled to said frame means for longitudinally supporting an elongated leverage pole.

13. The dolly bar storing assembly as defined in claim 12 wherein,
said leverage pole mounting means includes a first bracket mounted to one of the first pair of side portions and a second bracket mounted to one of the second pair of side portions, each said first bracket and said second bracket defining an aperture formed and dimensioned to slidably receive the leverage pole.

14. A method of storing a dolly bar longitudinally into a dolly bar storing assembly, the dolly bar including two substantially planar longitudinally extending side walls intersecting along a common edge to define a wedge-shaped traverse cross-sectional area, and a first flange portion mounted proximate one end of the dolly bar and extending radially outward from a surface opposite at least one of the two side walls, said method comprising the steps of:
longitudinally inserting the one end of the dolly bar into frame means having roller means formed for longitudinal rolling support of the dolly bar with said flange oriented to pass beyond said frame means;
rolling the dolly bar on said roller means longitudinally therealong relative said frame means until said flange portion is positioned inside said frame means; and
rotating the dolly bar on said roller means about the longitudinal axis of the dolly bar from an installing position to a storing position in which said flange means cannot pass beyond said frame means.

15. A method as defined in claim 14 further including:
vertically securing the dolly bar against said roller means by extending a locking bolt device transversely through said frame means and sufficiently close for contact therebetween a surface of said dolly bar.

16. A dolly bar sorting assembly for storing an elongated dolly bar therein, the dolly bar including two substantially planar longitudinally extending side walls intersecting along a common edge to define a wedge-shaped traverse cross-sectional area, and a first flange portion mounted proximate on end of the dolly bar and extending radially outward from a surface opposite at least one of the two sides walls, said storing assembly comprising:
- a frame for longitudinally supporting the dolly bar; and
- a roller mechanism including a first pair of wheel members and a second pair of wheel members longitudinally spaced-apart and positioned to provide rolling support of the dolly bar longitudinally therealong relative said frame in an orientation where both side walls of said dolly bar are inclined relative a horizontal plane with the common edge extending downwardly, each said first pair and said second pair of wheel members rotatably mounted to said frame at positions producing rotatable engagement with the two side walls of the dolly bar and supporting the dolly bar in a stable orientation therebetween, each wheel of said first pair of wheels and each wheel of said second pair of wheels includes a side wall engaging surface rotatably contacting the respective side wall at a contact plane, said contact plane being parallel to the respective side wall, and each said first pair and said second pair of wheel members further being spaced-apart and formed to support the dolly bar during rotation of the dolly bar about the longitudinal axis of the dolly bar between an installing position and a storing position.

17. The dolly bar sorting assembly as defined in claim 16 wherein,
said frame includes a first pair of spaced-apart side portions each of which rotatably supports one wheel of said first pair of wheels about first wheel axes, and a second pair of spaced-apart side portions each of which rotatably supports one wheel of said second pair of wheels about second wheel axes.

18. The dolly bar storing assembly as defined in claim 17 wherein,
said dolly bar includes a second flange portion mounted proximate an opposite end of the dolly bar and extends radially outward from the surface opposite at least one of the two side walls, each the first flange portion and the second flange portion having inner edges oppositely facing one another, and
said first side portions being spaced-apart from said second side portions such one of said first side portions is positioned proximate the inner edge of the first flange for contact therebetween when the dolly bar is in said storing position, and one of said second side portions is positioned proximate the inner edge of the second flange for contact therebetween when the dolly bar is in said storing position.

19. The dolly bar storing assembly as defined in claim 17 further including:
a vertical stop mechanism releasably mounted to said frame and engagable with the opposite surface of the dolly bar for reducing vertical displacement of the dolly bar relative said frame when the dolly bar is in said storing position.

* * * * *